United States Patent Office 3,456,035
Patented July 15, 1969

3,456,035
PRODUCTION OF CONDENSATION PRODUCTS FROM A GLYCIDYL ETHER COMPOUND, ETHERIFIED METHYLOL AMINOTRIAZINE, AND AN ALKANOL AMINE
Heinz Enders, Stadtbergen, near Augsburg, and Hans Deiner, Neusaess-Lohwald, near Augsburg, Germany, assignors to Chemische Fabrik Pfersee G.m.b.H., Augsburg, Germany, a German firm
No Drawing. Filed Feb. 13, 1967, Ser. No. 615,373
Claims priority, application Germany, Feb. 21, 1966, C 38,279
Int. Cl. C08g 45/10
U.S. Cl. 260—834　　　　　　　　　　10 Claims

ABSTRACT OF THE DISCLOSURE

Novel condensation products having valuable properties, which are soluble in water and can be hardened by heating, are produced by a process which, in general terms, includes heating glycidyl ethers of aliphatic or aromatic compounds containing at least 2 alcoholic or phenolic hydroxyl groups with practically completely methylolized aminotriazines, as well as with alkanol amines the alkanol groups of which contain from 2 to 4 carbon atoms.

---

This invention relates to a process of producing water-soluble heat-hardening condensation products and to products thereby produced.

An object of the present invention is the production of condensation products which are soluble in water and harden by heating, and which are most valuable as intermediate products for a variety of purposes.

Other objects will become apparent in the course of the following specification.

In the accomplishment of the objectives of the present invention it was discovered that water-soluble heat-hardening condensation products having valuable properties can be produced by heating glycidyl ethers of aliphatic or aromatic compounds containing at least 2 alcoholic or phenolic hydroxyl groups with practically completely methylolized aminotriazines, the methylol groups of which are advantageously extensively etherified by monovalent saturated alcohols with 1–4, preferably 1–3 carbon atoms, as well as with alkanol amines the alkanol groups of which contain from 2–4, particularly 2–3 carbon atoms, possibly in the presence of saturated monovalent alcohols with 1–4 carbon atoms. This heating is initially carried out while slowly distilling off the reaction water and the present alcohol, whereupon the mixture is heated for a while to higher temperatures of about 130° C.–160° C.

As soon as the viscosity of the reaction mixture has noticeably increased, which as a rule takes place about 10–30 minutes after the heating to the higher temperature had started, the reaction is slowed up by cooling and diluting with several times greater parts by weight of water or of a monovalent aliphatic alcohol with 1–4 carbon atoms. A neutralization of the product with weak to mediumly strong organic water-soluble acids also contributes to the cessation of the reaction.

Dilutions of the preferably neutralized reaction product with about 4 times its weight of water or a low monovalent aliphatic alcohol are very stable in stock. They can be dissolved in water in any proportions and particularly also in many organic solvents which are soluble in water or can be mixed therewith.

Compounds containing epoxy groups are derived from aliphatic or aromatic polyhydroxy compounds, so that they are glycidyl ethers of glycol, glycerin or in general of polyvalent aliphatic alcohols with at most 10 carbon atoms and at most 6 hydroxyl groups in the molecule. As examples of aromatic polyhydroxy compounds can be given resorcin or 4,4'-dihydroxydiphenyl-2,2'-propane.

Among the methylol aminotriazines which are preferably etherified and whose amino groups being methylolated to more than 80%, the most suitable are the corresponding derivatives of melamine; however, also suitable are those of melam, melem, ammeline, etc. As for as diaminotriazines are concerned, only tetramethylol compounds are suitable which may be etherified.

While pentamethylol triaminotriazines are suitable for the reaction, hexamethylol compounds result in particularly stable products.

The reaction with etherified methylol aminotriazines has also an advantageous effect upon the stock stability of the reaction products. Etherification can be preferably carried out with methanol, although ethanol or propanol and eventually butanol are also suitable.

As far as alkanol amines are concerned, triethanol and tripropanol amines are particularly well suited. However, mono- or di-alkanol amines can be also used for the reaction.

The relative amounts of the compounds containing epoxy groups, the possibly etherified methylol aminotriazines and the alkanol amines can vary.

As a general rule it can be stated that preferably about 1 mole or somewhat less of alkanol amine should be used for 1 mole of the epoxy compound. The amounts of possibly etherified methylol aminotriazine influence the stability of the obtained products. Larger amounts increase the stability and at the same time diminish the hardening, while smaller amounts have the opposite effect.

To provide a sufficient stability of the reaction products on the one hand and to provide a sufficient hardening speed on the other hand, it is advisable to use about ½ mole methylol aminotriazine, so that the mole ratio of the epoxy compound to aminotriazine compound to alkanol amine is about 1:0.5:1. The amount of alkanol amine can be lowered to 0.8 mole, while that of the aminotriazine compounds can be raised up to 0.1 mole or to 1 mole.

Compounds produced within these ranges also result in products which have basically the same properties as far as their use is concerned.

The heating temperature used for the final reaction depends upon the duration, but also upon the components as well as their amount ratios. In any event the heating is terminated as soon as a substantial increase in the viscosity of the reaction mixture can be determined, then the mixture is stirred while cold and the reaction is terminated by the addition of low monovalent alcohols and/or neutralization.

When the reaction mixture is heated for too long a time or to excessively high temperatures, not only does the viscosity increase too highly, but also the water-solubility of the reaction product is continuously increased up to its resination.

When the reaction products or their solutions are heated an insoluble resin is formed after the evaporation of the solvents. Thus the products are suitable as a base for coatings and lacquers. However, they also effect the hardening of organo polysiloxanes and can be used with their aqueous emulsions.

Furthermore, the reaction products made in accordance with the present invention have the property to transfer water-insoluble organic or inorganic substances, such as paraffin, saponifiable oils and fats, organo polysiloxanes, polymerisates of unsaturated compounds, perfluorized organic compounds or inorganic pigments into stable aqueous emulsions. When materials are treated with such emulsions and are then heated, the emulsion is destroyed and the emulsified substances are fixed by the resinification of the reaction product.

The following examples are given by way of exemplification only:

EXAMPLE 1

175 gr. glycidyl ether of 4,4'-dihydroxydiphenyl-2,2'-propane (0.43 epoxy group per 100 gr.), 90 gr. hexamethylol melamine which was extensively etherified by methanol, 75 gr. triethanolamine and 175 gr. methanol are poured into a three neck flask with a downwardly extending cooler, a thermometer and a stirrer. The mixture is slowly heated.

The methanol-water mixture which is precipitated with increasing temperature is continuously distilled off. After the termination of the distillation the reaction mixture is further heated for 20–30 minutes up to 140° C.; then the viscosity is noticeably increased and the product is soluble in dilute acetic acid and isopropanol. The reaction is stopped by cooling and the addition of 120 gr. isopropanol. The resulting condensation product is of light brown color and can be diluted with 4 times its weight of water to form a stable solution. When the diluted or the undiluted product is heated upon a glass plate an insoluble resin is formed. The above-mentioned aqueous solution of the product can be further diluted with water to any desired extent. It can be also added as hardening means to an aqueous organo-polysiloxane emulsion. Furthermore, if it is mixed with 1½ amount by weight of a 50% solution of a polysiloxane in perchlorethylene, it forms an emulsion which is stable after homogenization and can be diluted with water.

The hardening of the siloxane takes place merely by heating the materials which have been treated by such an emulsion.

EXAMPLE 2

Methyl ether of hexamethylol melamine used in Example 1, is replaced by 150 gr. non-etherified hexamethylol melamine, other ingredients and conditions being the same. Then a product is obtained which has the same properties as far as solubility, hardening and emulsification capacity are concerned. However, it is not as stable.

EXAMPLE 3

The reaction is carried out as in Example 1, leaving out 175 gr. methanol, however. After distilling off the water, the mixture is heated to 140° C. and after the viscosity has noticeably increased the reaction is stopped by the addition of 120 gr. isopropanol, 100 gr. water and 23 gr. acetic acid (60%) as well as cooling.

The product which is thus obtained can be diluted with water to a clear liquid in any proportion and when heated upon a glass plate produced a hard film. It is also suitable for the emulsification of paraffin without the additional use of a usual emulsifier.

EXAMPLE 4

290 gr. of glycidyl ether of glycerin with an epoxy number 0.7 are slowly heated while stirring with 50 gr. hexamethylolmelamine pentaethylether, 120 gr. diethanolamine and 175 gr. ethanol, and a water-ethanol mixture is distilled. Then the temperature is increased to 140° C. After 10–15 minutes the viscosity has noticeably increased and the reaction is stopped by the addition of 200 gr. ethanol or diluted acetic acid and cooling. This product can be diluted with water at will and, for example, is suitable as hardening means for aqueous polysiloxane emulsions.

EXAMPLE 5

350 gr. resorcin glycidylether (epoxy number 0.8) are mixed with 480 gr. tetramethylolammelinetetramethylether, 190 gr. tripropanolamine and 400 gr. methanol and are slowly heated while stirring, whereby water and methanol are distilled off. Then the heating is continued to 150° C. As soon as the reaction mixture becomes noticeably viscous, 300 gr. ethanol are stirred in and thus the reaction is stopped.

It is apparent that the examples described above have been given solely by way of exemplification and not by way of limitation and that they are capable of many variations and modifications within the scope of the present invention. All such variations and modifications are to be included within the scope of the present invention. However, it was found impossible to define the product of the present invention except by the process of its manufacture.

What is claimed is:

1. The process for producing water-soluble heat-hardening condensation products, which comprises reacting
   (a) one mol of a glycidyl ether of a compound selected from the group consisting of aliphatic polyhydroxy compounds with at most 10 carbon atoms and at most 6 hydroxyl groups in the molecule and aromatic polyhydroxy compounds with one or two phenylene groups and 2 hydroxyl groups in the molecule with
   (b) 0.1 to 1.0 mol of an ether of a highly methylolated amino triazine with an monovalent saturated aliphatic alcohol having from 1 to 4 carbon atoms and with
   (c) 0.8 to 1.0 mol of a compound of the formula $$H_xN(ROH)_{3-x}$$

wherein R is an alkylene radical having from 2 to 4 carbon atoms and $x$ is a whole number between 0 and 2
by increasing the temperature to above 100° C. while distilling off reaction by-products and stopping the reaction by cooling.

2. The process in accordance with claim 1, wherein the amino groups of the etherified methylolated amino triazine are methylolated to more than 80%.

3. The process in accordance with claim 1, wherein the ether of the highly methylolated amino triazine is etherified hexamethylol melamine.

4. The process in accordance with claim 1, wherein said etherified methylolized amino triazine is formed in situ from a methylolated amino triazine and a monovalent aliphatic saturated alcohol having from 1 to 4 carbon atoms.

5. The process is accordance with claim 1, wherein the reaction is carried out in presence of an excess of the monovalent saturated aliphatic alcohol.

6. The process in accordance with claim 1, wherein 0.5 mole of the methylolated amino triazine are reacted.

7. The process in accordance with claim 1, wherein said compound having the formula $H_xN(ROH)_{3-x}$ R is an alkylene radical having 2 or 3 carbon atoms.

8. The process in accordance with claim 1, wherein after the distillation the reaction mixture is heated to a temperature between about 130° C. and about 160° C.

9. The process in accordance with claim 1, wherein the reaction is stopped by the addition of monovalent saturated alcohols with 1–4 carbon atoms.

10. The process in accordance with claim 1, wherein the reaction is stopped by neutralization with diluted aqueous acids.

References Cited

UNITED STATES PATENTS 2,915,502  12/1959  Albrecht.

WILLIAM H. SHORT, Primary Examiner

T. PERTILLA, Assistant Examiner

U.S. Cl. X.R.

260—2, 47, 849